United States Patent [19]

Pittman

[11] 4,376,435
[45] Mar. 15, 1983

[54] SOLAR POWERED AIR CONDITIONING SYSTEM

[76] Inventor: Charles D. Pittman, P.O. Box 592, Oldsmar, Fla. 33557

[21] Appl. No.: 252,147

[22] Filed: Apr. 8, 1981

[51] Int. Cl.³ .......................... F24J 3/02; F25D 23/12
[52] U.S. Cl. ................................. 126/435; 62/235.1; 62/260; 165/45
[58] Field of Search ........................................ 126/417, 126/433, 435; 165/45; 62/235.1, 260

[56] References Cited

U.S. PATENT DOCUMENTS

| | | | |
|---|---|---|---|
| 4,011,731 | 3/1977 | Meckler | 62/235.1 |
| 4,100,756 | 7/1978 | Albertson | 62/235.1 |
| 4,142,576 | 3/1979 | Perry et al. | 165/45 |
| 4,146,013 | 3/1979 | Foulke | 126/435 |
| 4,173,994 | 11/1979 | Hiser | 126/435 |
| 4,206,745 | 6/1980 | Gilgen | 126/433 |
| 4,220,138 | 9/1980 | Bottum | 126/433 |
| 4,237,184 | 6/1981 | Tanaka et al. | 62/235.1 |
| 4,265,220 | 5/1981 | McAlister | 126/435 |
| 4,325,357 | 4/1982 | Wormser | 165/45 |
| 4,327,560 | 5/1982 | Leon et al. | 62/260 |

Primary Examiner—Daniel J. O'Connor
Attorney, Agent, or Firm—Ronald E. Smith

[57] ABSTRACT

An assembly that harnesses solar power for diverse applications. The principal application utilizes three closed loop elements for operating an air conditioning system. The first loop is a brine-carrying conduit, said brine being heated in a solar collector. The heat of said brine is exchanged, in a boiler means, to a refrigerant fluid carried by a second loop element. The vaporized refrigerant fluid drives a first double acting air cylinder which in turn drives a second air cylinder that can be single acting for some pumping application and which is double acting in the air conditioning application.

In such air conditioning application, the second air cylinder serves as the refrigerant fluid compressor means for the assembly. A countershaft member which carries the fans for the evaporator and condenser coils of the air conditioning system is rotated by a linkage apparatus that converts axial oscillation of the output shaft of the first air cylinder member into unidirectional rotation of such countershaft member, and a pump that circulates the refrigerant fluid through the second loop is also driven by said countershaft member.

A third loop element condenses the spent refrigerant fluid—in a heat exchanger means—for subsequent re-expansion in the first double-acting air cylinder member—by transferring the heat of said spent fluid to cool water circulating through said third loop, a portion of said third loop being underground to lower the temperature of such water.

8 Claims, 3 Drawing Figures

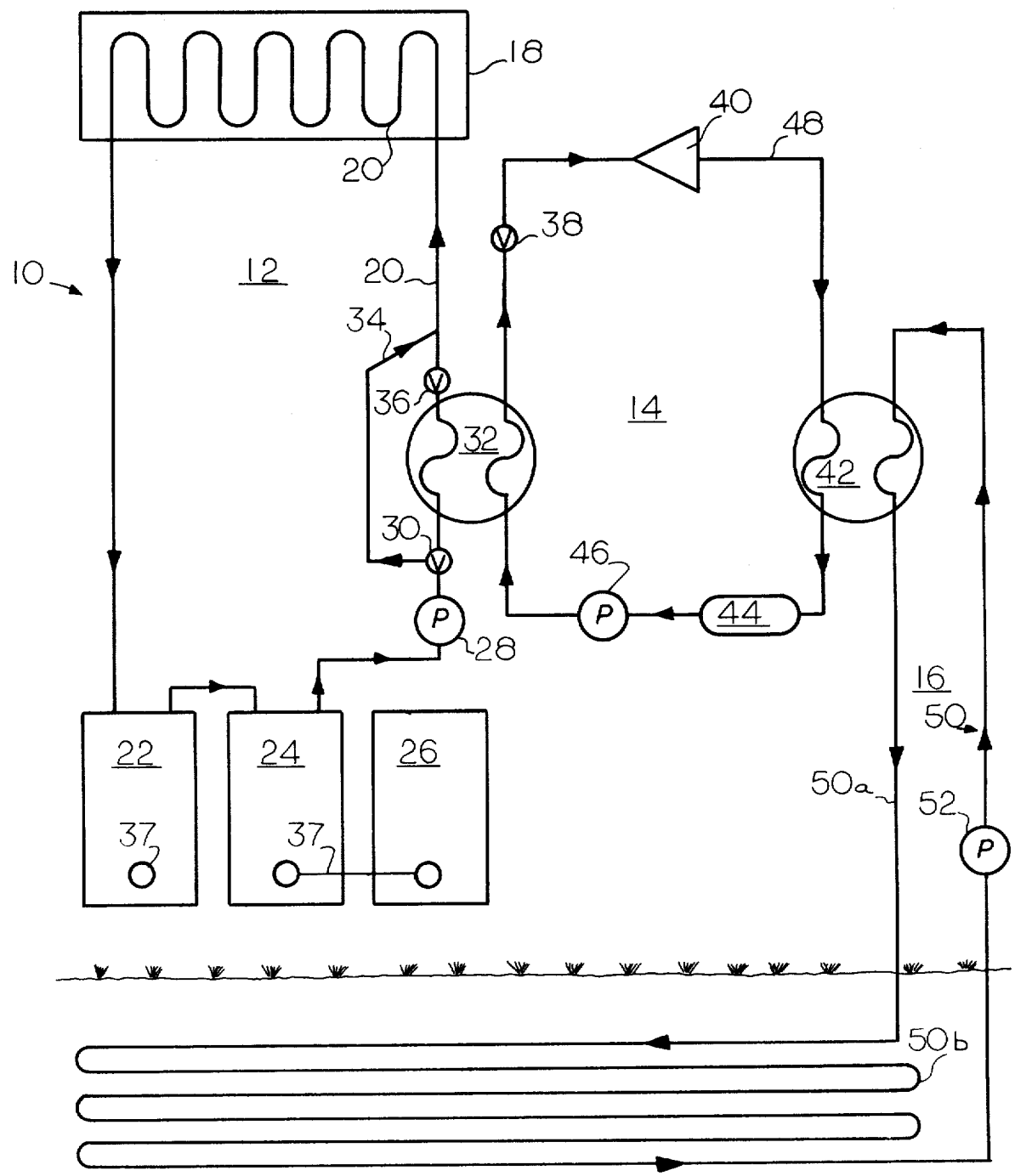
FIG_1

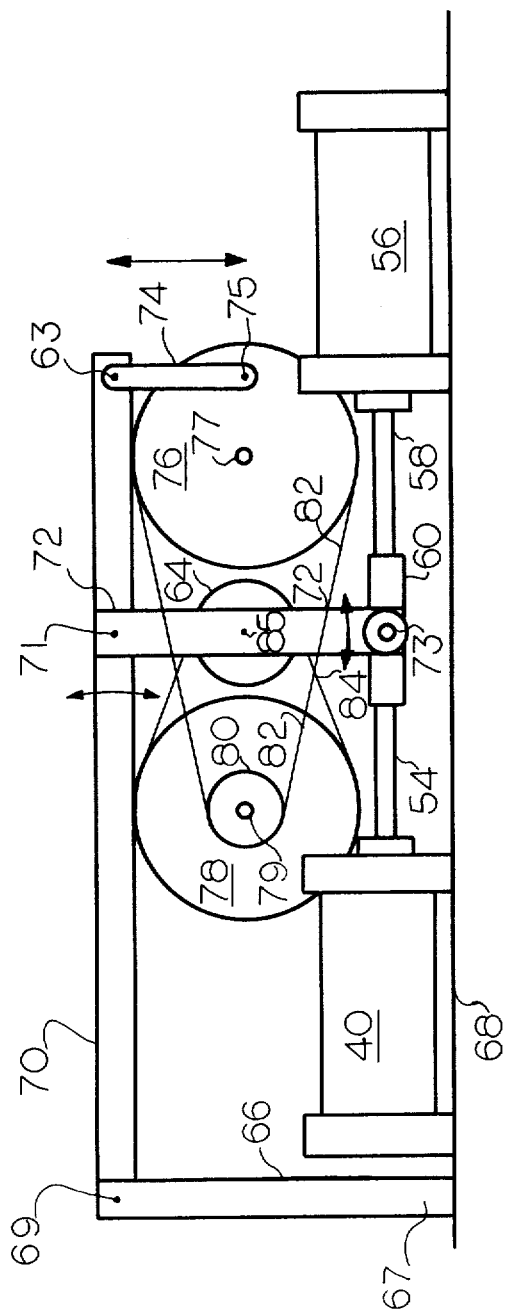

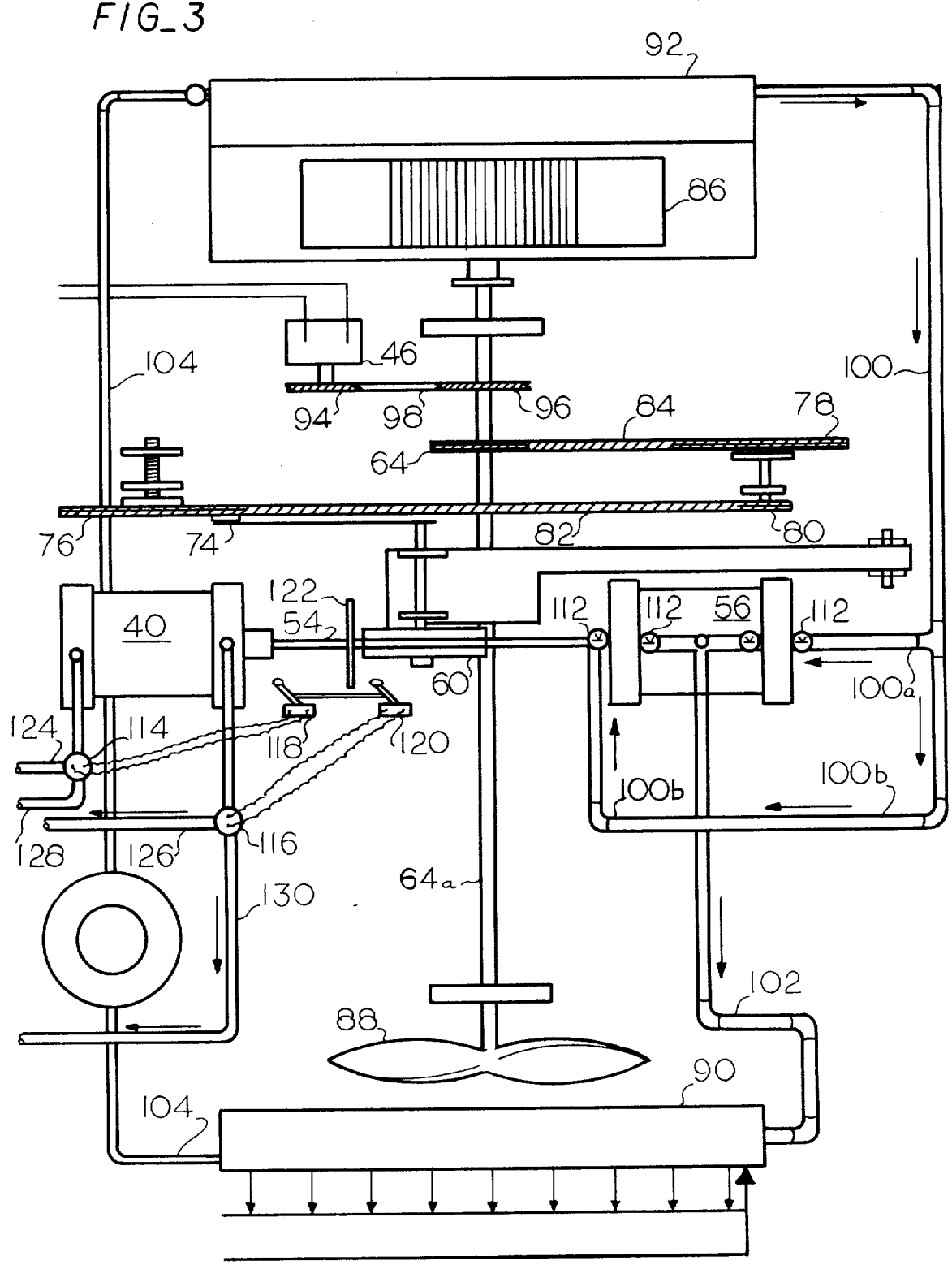
FIG_3

4,376,435

SOLAR POWERED AIR CONDITIONING SYSTEM

BACKGROUND OF THE INVENTION

1. Field of the Invention

This invention relates generally to an apparatus for harnessing solar power to operate an air conditioning system, and more specifically relates to such an apparatus having a motor means in the form of a double-acting air cylinder member that is operated by an elevated pressure and temperature refrigerant fluid that has derived said properties from solar heat.

2. Description of the Prior Art

Assemblies for harnessing solar power to do useful work are ubiquitous, but an assembly that harnesses such power to operate an air conditioning system of the type shown and described hereinafter was not known prior to this disclosure.

SUMMARY OF THE INVENTION

A first double-acting air cylinder is connected in driving relation to a second double-acting air cylinder that serves as a refrigerant fluid compressor. The first air cylinder is driven by expanding gases that have been heated, in a heat-exchanger or boiler means, by hot brine circulating through a solar collector/storage tank assembly. The spent gases exit the first air cylinder member and are condensed in a heat-exchanging reaction in a condenser unit that carries water that has been cooled by passing such water through an underground conduit. The first double-acting air cylinder also rotates a countershaft means that operates the fans for the air conditioning system, as well as a pump for the refrigerant fluid that drives said first air cylinder upon expansion thereof.

It is therefore seen to be the primary object of this invention to provide an air conditioning system that derives its operating power from the sun.

Another object is to provide a solar power-harnessing apparatus that can operate pumps for a plurality of other applications as well.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description taken in connection with the accompanying drawings, in which:

FIG. 1 is a schematic representation of the three loop elements that collectively comprise the inventive means for operating the engine expander.

FIG. 2 is an elevational view of the engine expander, the driven cylinder, and the linkage assembly for translating axial oscillation of the engine expander's output shaft into rotation of a countershaft.

FIG. 3 is a schematic representation of the inventive means of operating the driven air cylinder as a refrigerant compressor unit.

Similar reference numerals refer to similar parts throughout the several views of the drawings.

DETAILED DESCRIPTION OF THE PREFERRED EMBODIMENT

As shown in FIG. 1, the inventive solar operated system, generally designated 10, comprises three closed operating loops designated 12, 14 and 16.

Operating loop 12 includes a solar collector means 18 mounted in heat-receiving relation to the sun, said collector means 18 including sinuous tubular conduit means 20, and the loop 12 further includes first and second storage tank members 22, 24, a pressure maintaining tank 26, a circulating water pump 28 (activated by photo-sensitive means so that it is activated only when sunlight is available), a thermostatically-controlled mixing valve 30, a boiler member 32, a boiler bi-pass line 34, and a reverse flow blocking check valve 36. An auxiliary heating element 37 (illustratively shown in tank 22) is included for sunless days.

The working fluid that flows through tubular conduit means 20 in the direction indicated by the arrows appearing in FIG. 1 is a brine solution that can attain temperatures of approximately 250°-350° F. without boiling, due to its brine content and due to the pressure within the loop of about 100 PSI, as maintained by the pressure tank 26 through equalizer tube 37.

Operating loop 14 interfaces with operating loop 12 within the boiler 32, it being understood that boiler 32 is a heat-exchanger means. Loop 14 includes throttling valve 38 for controlling the speed of operation of the engine expander 40, condenser unit 42, expander chamber 44, a high pressure liquid pump 46, said loop components being serially interconnected by tubular conduit member 48 which carries, preferably, a refrigerant fluid such as Freon of the type known commercially as R22 Freon.

Operating loop 16 interfaces with loop 14 in condenser unit 42. Loop 16 includes conduit member 50 having an above ground portion 50a and a subsurface portion 50b of serpentine configuration, said subsurface portion 50b being preferably embedded about one foot into the earth. Water is the preferred working fluid for loop 16. Sufficient antifreeze is admixed with the water to guard against cold weather freezing. In a typical installation, the one foot thick layer of insulation afforded by the earth will provide water of about 70° F. to the condenser unit 42, which water is circulated through conduit 50 by circulating water pump 52.

The R22 Freon circulating in closed operating loop 14 continously changes its state as it circulates therethrough. The working fluid is in its liquid state as it is pumped into the boiler 32 by high pressure pump 46. Although the temperature of the working fluid in loop 12 may reach 300° F., as aforesaid, mixing valve 30 and boiler bi-pass line 34 serve to insure that the temperature of the brine in conduit 20, as it exits the boiler 32, is held to 120°-130° F. Such temperature is sufficient to change the Freon in conduit 48 to a vapor (at 120° F., R22 Freon will have a vapor pressure of 260 PSI, and at 130° F., it will have a vapor pressure of 296 PSI). This vapor pressure is harnessed to drive engine expander 40 to obtain useful work from the inventive system 10. The spent vapor is returned to its liquid state in condenser 42 as it gives up its heat to the 70° F. water circulating in heat-exchanging relation through said condenser 42. Accordingly, the Freon exiting the condenser 42 will have a temperature no higher than 80° F. and a pressure of about 144 PSI. It is the pressure differential between the Freon in the boiler 32 (296 PSI) and exiting the condenser 42 (144 PSI) that necessitates the use of high pressure pump 46 as those skilled in the art will readily appreciate, and it is this 144 PSI pressure differential that operates the engine expander 40 in the manner hereinafter described.

Reference should now be made to FIG. 2, wherein the engine expander 40 is shown in greater detail. The engine expander 40, in the preferred embodiment, is a double-acting air cylinder having an axially projecting output shaft 54 that reciprocates along its longitudinal axis of symmetry attendant oscillation of a piston means (not shown) that is slideably mounted within the cylindrical walls of said air cylinder 40, which oscillation is responsive to the continuous introduction of the Freon R22 working fluid, in its vapor state (296 PSI, 130° F.), from the boiler 32 into successively alternating opposed ends of the cylindrical engine expander 42 so that said working fluid successively impinges upon opposite faces of said piston means, thereby imparting reciprocating motion thereto and hence to said output shaft 54 integrally formed therewith.

A second double-acting air cylinder 56 having input shaft 58 is yoked by sleeve member 60 to the output shaft 54 of the engine expander 40. Output shaft 54 must be disposed in axially aligned relation to input shaft 58. The second double-acting air cylinder 56 is passive in its operation, since it is driven by the engine expander 40.

The driven cylinder 56 may be used as a circulating water pump for such diverse applications as irrigation and swimming pools. When so used, no substantial additional structure is required.

However, the driven cylinder 56 may also be used as a refrigerant fluid compressor in an air conditioning system. Further, when it is desired to incorporate such driven air cylinder 56 into an air conditioning system, the oscillating action of the output shaft 54 of the driving air cylinder 40 can be harnessed to not only drive the air cylinder 56 through sleeve member 60, but to also rotate a countershaft member that performs important functions in such an air conditioning system.

More specifically, a four (4) element linkage, collectively designated 62, best seen in FIG. 2, is inventively deployed to translate the axially reciprocating motion of output shaft 54 into rotating motion of the countershaft pulley 64. An upstanding first link element 66 is fixedly secured as at 67 to a support surface 68. The free end of the first link element 66 is pivotally secured at as 69 to an elongate, longitudinally disposed second link element 70. A third link element 72 interconnects said second link element 70 and the sleeve member 60 as shown, and is accordingly pivotally mounted to the link 70 and sleeve 60, as at 71 and 73 respectively. A fourth link element 74 is pivotally secured at one of its ends to the free end of the second link element 70 as at 63 and has its other end pivotally secured as at 75 to a rotatably mounted first pulley member 76 having axis of rotation 77, said pivotal connection between said fourth link 74 and said pulley member 76 being made at preselected point 75 that is radially spaced from said axis of rotation 77. Accordingly, axial reciprocation of output shaft 54 imparts a swing or pendulum-like motion to the third link element 72 which in turn imparts a cranking motion of the fourth link element 74, thereby rotating pulley member 76 about its axis of rotation 77.

Since the working fluid enters the driving air cylinder, or engine expander 40, at 296 PSI and is exhausted therefrom at 144 PSI, as aforesaid, the working pressure differential of 296−144=152 PSI is realized. In the preferred embodiment, the length of the piston stroke of the driving air cylinder 40 is 8 inches, and such PSI produces 90 strokes thereof per minute. The four element linkage 62 thus causes pulley member 76 to rotate at 90 revolutions per minute. A second pulley member 78 having hub 80 is therefore provided, wherein the diameter of the hub 80 is one-fourth the diameter of pulley 76. Accordingly, interconnecting pulley 76 and pulley 78 via hub 80 by employing a drive element such as a belt or chain 82 will multiply the speed of rotation of pulley 78 by a factor of 4 relative to the speed of rotation of pulley 76. Hence, pully 78 will rotate about its axis of rotation 79 at a speed of 360 revolutions per minute. Similarly, a drive element 84 disposed in interconnecting relation to the respective peripheries of pulley 78 and countershaft-carrying pulley 64 will effect rotation of the countershaft pulley 64 about its axis of rotation 85 at a speed of 360×3=1080 revolutions per minute, the diameter of pulley 78 being 3 times greater than the diameter of countershaft pulley 64.

Turning now to FIG. 3, it will there be seen that this rotating countershaft pulley 64 is inventively and advantageously employed to operate a squirrel-cage type blower 86 and a fan 88. Such fans are mounted for conjoint rotation on opposite, axially spaced ends of the countershaft 64a. The fans 86 and 88 perform their conventional tasks, i.e., the fan 86 aids refrigerant fluid evaporation and circulates the air being cooled—as a result of the heat-absorbing evaporation process—through the duct system and air return (not shown), and the fan 88 cools the refrigerant gas in the outside heat-exchanger/condenser 90 so that such gas releases the heat absorbed in the evaporator 92 and returns to its liquid state prior to re-expansion and re-evaporation in such inside heat-exchanger/evaporator means 92.

The rotation of the countershaft 64a is also harnessed to drive high pressure liquid pump 46, also shown in FIG. 1 and described in connection therewith, by interconnecting a pulley 94 conjointly rotatably with said pump 46 and a pulley 96 carried by the countershaft 64a with a V-belt 98.

The inside heat exchanger unit 92 is connected in series by R12 Freon-carrying conduit 100 to the suction side of the driven air cylinder 56 which accordingly serves as the refrigerant fluid compressor for the inventive system. High pressure vapor from the compressr 56 is carried to the outside heat-exchanger 90 by conduit 102, and conduit 104 returns the refrigerant fluid to the evaporator 92.

It will be observed that suction line 100 branches into conduits 100a and 100b, and that a plurality of check valves, collectively designated 112, are provided in said conduits. In this manner, a continuous flow of compressed refrigerant fluid is pumped through conduit 102 even though fluid flows through conduits 100a and 100b only on an alternating basis (to impart reciprocating motion to the piston (not shown) that is slideably mounted interiorly of said cylinder 56). The check valves 112 permit fluid flow into the air cylinder 56 through either conduit 100a or 100b, but block flow out of the cylinder 56 through either of said lines 100a or 100b, so that the refrigerant fluid must exit the cylinder 56 through conduit 102. It should be remembered, of course, that the reciprocation of the piston within cylinder 56 is effected by reason of its yoking by sleeve 60 to the engine expander 40.

The double-acting piston (not shown) of the engine expander 40 is reciprocated by the introduction there-into of the R22 Freon at 296 PSI, as aforesaid. A pair of 3-way electrically activated gaseous fluid controlled solenoid valves 114, 116 route the Freon into opposite ends of the cylinder 40 on a successively alternating basis. The limit switches 118, 120 which activate the valves 114, 116, respectively, are thrown by a striker bar 122 which is carried by the output shaft 54 of the engine expander 40 and which accordingly impinges upon and operatively displaces alternating ones of the switches 118, 120 attendant system operation. Conduits 124 and 126 provide fluid communication between opposite ends of the cylinder 40 and the boiler 32, whereas lines 128 and 130 provide such communication between such opposite ends and the condenser 90.

Accordingly, solar heat collected by collector 18 (FIG. 1) is exchanged in boiler 32 to a working fluid which drives engine expander 40 upon vaporization, and a novel linkage and pulley system enables the engine 40 to drive an air compressor for an air conditioning system and other component parts of such a system so that all of the power required to operate such system is solar derived.

It will thus be seen that the objects set forth above, and those made apparent by the preceding description, are efficiently attained, and since certain changes may be made in the above construction without departing from the scope of the invention, it is intended that all matters contained in the foregoing description or shown in the accompanying drawings shall be interpreted as illustrative and not in a limiting sense.

It is also understood that the following claims are intended to cover all of the generic and specific features of the invention herein described, and all statements of the scope of the invention which as a matter of language might be said to fall therebetween.

Now that the invention has been described,
That which is claimed is:

1. An assembly for harnessing solar power to operate an air conditioning system, comprising,
   a first conduit means defining a first closed loop element,
   a first heat-absorbing fluid circulatable through said first loop element,
   a second conduit means defining a second closed loop element,
   a second fluid that has a low boiling point, relative to the boiling point of said first fluid, circulatable through said second loop element,
   a first heat-exchanger means disposed in heat exchanging relation between said first and second loop element so that heat in said first fluid is transferred to said second fluid in amounts sufficient to vaporize said second fluid,
   an engine expander means operatively connected in fluid communication to said first heat exchanger means so that said vaporized second fluid drives said engine expander means,
   a third conduit means defining a third closed loop element,
   a third heat-absorbing fluid circulatable through said third loop element,
   a portion of said third loop element disposed in buried relation to the surface of the earth by a depth sufficient to cool said third fluid as it circulates through said buried portion,
   a second heat-exchanger means disposed in heat exchanging relation between said second and third loop elements so that heat in said second fluid is transferred to said third fluid for the purpose of returning said second vaporized fluid to its liquid state prior to re-entry of said second fluid into said first heat-exchanger means,
   whereby said engine expander means provides useful work responsive to heating of said first fluid by the sun, vaporizing by said first fluid of a second fluid which drives said engine expander means, and condensation of said second fluid, for subsequent reevaporation, by a third fluid made relatively cooler than said second fluid in a fourth heat-exchanger means provided by the earth.

2. The assembly of claim 1, wherein said engine expander means comprises a double-acting air cylinder means having a piston means slideably mounted therein and reciprocable responsive to impingement thereagainst of said second fluid in its vapor state on successively alternating opposite sides thereof, and wherein a piston rod means is fixedly secured to said piston means and disposed coincident with the axis of oscillation of said piston means and hence defines an axially oscillating output shaft.

3. The assembly of claim 2, further comprising gaseous fluid valve means for admitting said second fluid in its vapor state into oppostie ends of said air cylinder means on a successively alternating basis, said valve means individual to each of said opposite ends of said air cylinder means, switch means individual to each of said valve means for operating the same, a striker bar means fixedly secured to said axially oscillating output shaft of said air cylinder means and disposed in contacting and hence operable relation to successively alternating ones of said switch means attendant output shaft oscillation so that each oscillation of said output shaft opens and closes said switch means and hence said valve means to effect reciprocation of said piston means.

4. The assembly of claim 3, further comprising a second air cylinder or pump means having an input shaft that is operably connected in driven relation to said engine expander means so that axial oscillation of said output shaft of said engine expander means effects conjoint axial oscillation of said input shaft of said pump means so that said pump means does useful work in the form of circulating water or other fluids through swimming pool filters, irrigation ditches and the like.

5. The assembly of claim 4, wherein said pump means is a double-acting air cylinder means that provides a compressor means for an air conditioning or heat pump system, said pump means when so used having suction lines carrying refrigerant fluid on a successively alternating basis from a first heat exchanger means to opposite sides of said air cylinder for reciprocating a fluid-compressing piston means therein, said compressor means having one outlet line providing fluid communication between said compressor means and a second heat-exchanger means, and said compressor means provided with a plurality of check valve means to provide continuous one way flow of compressed refrigerant fluid through said outlet line.

6. The assembly of claim 5, further comprising a countershaft means having individual, conjointly rotatable fan means carried on axially spaced opposite ends thereof, said fan means disposed in unrestricted fluid communication with different ones of said first and second heat-exchanger means, and further comprising means for imparting unidirectional rotation to said countershaft means attendant axial oscillation of said engine expander means to cause said fans to rotate and hence to impinge air against said respective heat-exchanger means attendant system operation.

7. The assembly of claim 6, wherein said means for imparting unidirectional rotation of said countershaft comprises a sleeve member which is co-axially aligned with and which rigidly interconnects the output and input shafts of said respective air cylinder means, a first pulley member interconnected with said countershaft by a first drive element, a second pulley member interconnected with first pulley member by a second drive element, a first link member rotatably mounted adjacent the periphery of said second pulley member, a linkage assembly for imparting orbital motion of said first link member relative to the axis of rotation of said second pulley member in a plane orthogonal to said axis of rotation, said linkage assembly pivotally connected to said sleeve member so that oscillation of said output and input shafts imparts rotation to said second pulley member and hence to said first pulley member and hence to said countershaft.

8. The assembly of claim 7, wherein said linkage assembly further comprises a generally upstanding leg member having one end fixedly secured to a support surface, an elongate, longitudinally disposed interconnecting member extending from the free end of said leg assembly to said first link member, said interconnecting member pivotally mounted at its opposite ends to said leg and first link members, a second link member disposed in interconnecting relation between said longitudinally disposed link member and said sleeve member and pivotally mounted at its opposed ends to said longitudinally disposed link member and said sleeve member, said second link moveable in an arc responsive to axial oscillation of said output shaft of said engine expander so that such oscillation imparts oscillating arcuate movement to said second link member and hence imparts orbital movement to said first link member through said longitudinally disposed interconnecting member.

* * * * *